Figure 1:
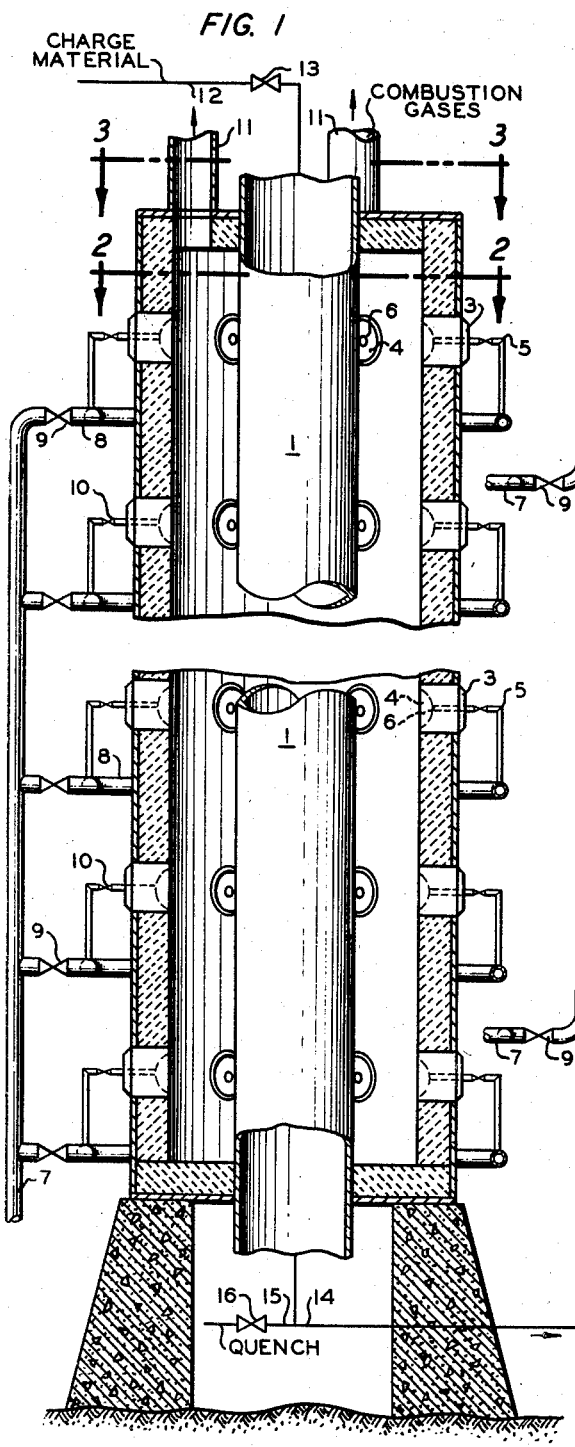

Oct. 13, 1959

J. G. ALLEN 2,908,631

CONVERSION PROCESS AND APPARATUS

Filed Aug. 4, 1955

3 Sheets-Sheet 1

*INVENTOR.*
J.G. ALLEN

BY

*Hudson & Young*
*ATTORNEYS*

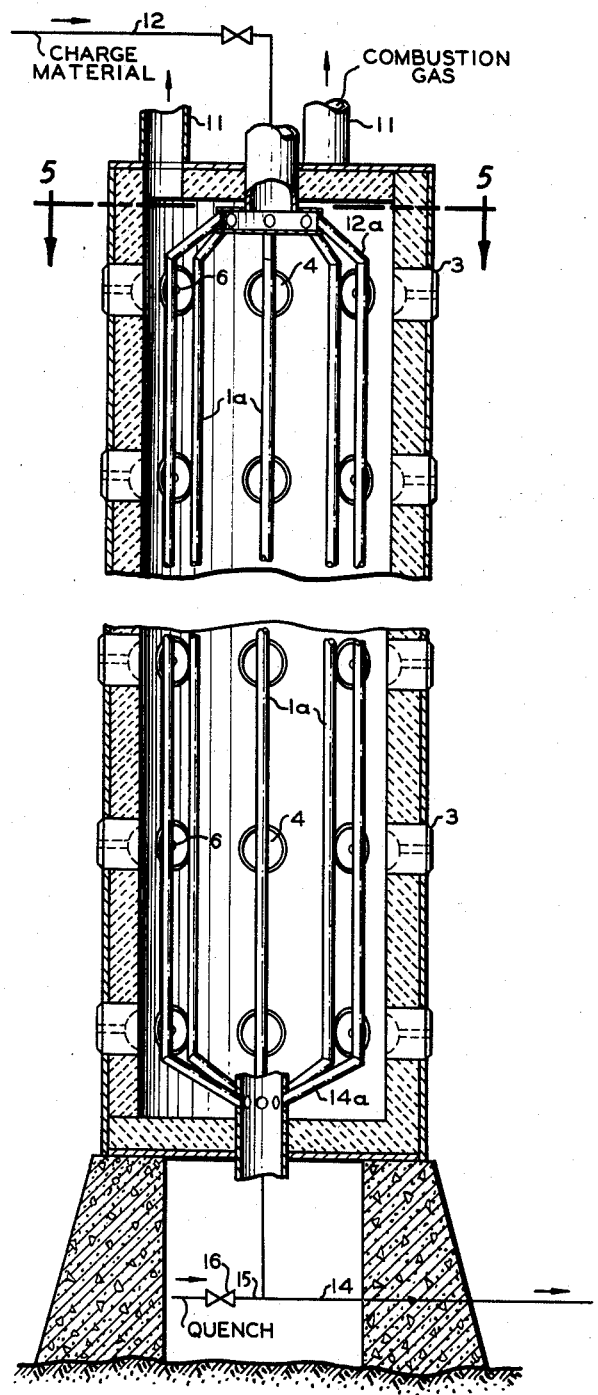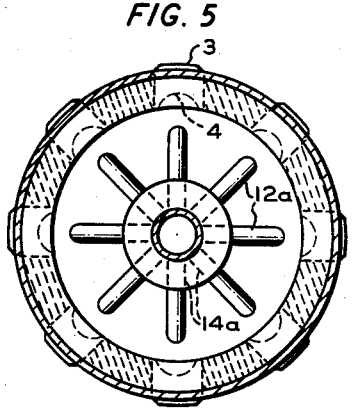

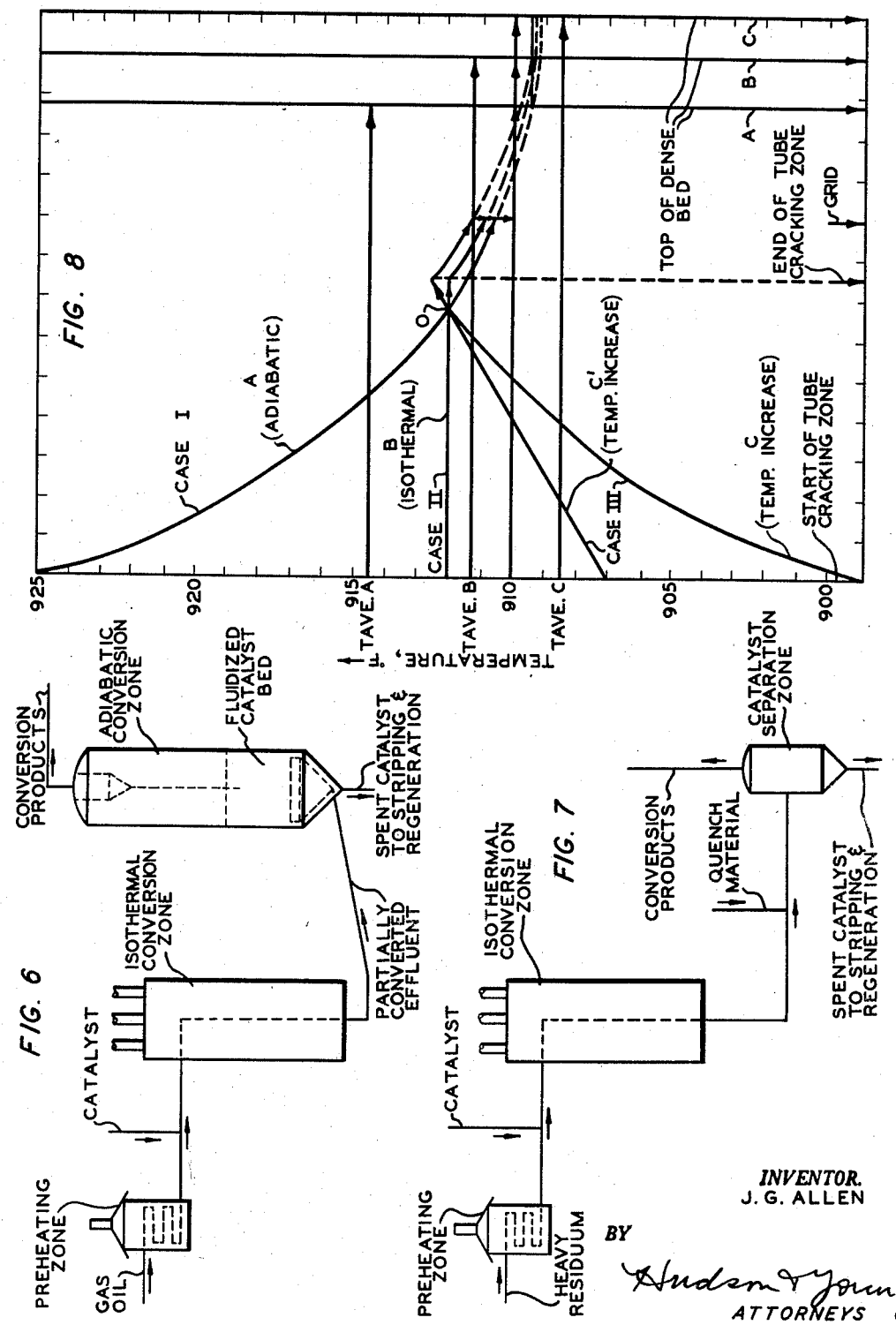

United States Patent Office 2,908,631
Patented Oct. 13, 1959

2,908,631

CONVERSION PROCESS AND APPARATUS

John G. Allen, Bartlesville, Okla., assignor to Phillips Petroleum Company, a corporation of Delaware Application August 4, 1955, Serial No. 526,389

17 Claims. (Cl. 208—75)

This invention relates to apparatus and to processes for effecting a reaction or conversion. In one aspect the invention relates to a substantially cylindrical furnace containing vertically disposed means adapted to confine a flowing fluid, said furnace being of such construction that it is capable in its operation of evenly distributing both radiant heat, and heat from combustion gases transferred by conduction, to said flowing fluid present at a given level in the fluid confining means and also being capable in its operation of distributing different amounts of radiant heat to said flowing fluid present in said fluid confining means at different levels so as to control the temperatures of said fluid at said different levels during its flow. In another aspect the invention relates to a process for conversion of a flowing fluid which comprises preheating said fluid and then passing it along a path wherein it is converted, and controlling the temperature of the fluid along said path by adding variable amounts of radiant heat at different points along said path.

It is an object of this invention to provide a furnace in which a chemical reaction or conversion can be effected with maximum efficiency at optimum temperature at all times during the conversion. It is another object of this invention to provide a furnace, containing a single tube or conduit adapted to confine a flowing fluid, which furnace in its operation is capable of transferring both radiant heat and heat by conduction and convection evenly around the circumference of the tube. Another object of the invention is to provide a process for effecting a reaction or conversion of a flowing fluid while maintaining the conversion mixture at an optimum desired temperature or temperature range throughout a period of conversion. Still another object is to provide a process for the control of temperature of an endothermic catalytic reaction or conversion of a flowing hydrocarbon.

Other objects and aspects, as well as advantages of the invention will be apparent from a study of the disclosure, the drawings, and the appended claims.

According to my invention, there are provided a process and apparatus for effecting a chemical reaction or conversion.

Thus, according to my invention there is provided a furnace comprising a substantially cylindrical, vertically disposed refractory shell, means substantially vertically disposed within said shell adapted to confine a flowing fluid, a plurality of substantially vertically spaced, circumferential rows of radiant burners in said shell, the burners in each circumferential row being equally spaced from adjacent burners, each row of burners being adapted to be independently controlled as a unit, said furnace having a plurality of symmetrically located, circumferentially equally spaced flues at the top.

According to a now preferred aspect of the apparatus of the invention, there is provided a furnace of the foregoing description having a single conduit or tube, axially located within said shell, which is adapted to confine a flowing fluid, the single tube or conduit so positioned being capable of receiving an even flow of radiant heat around its circumference at any given level from the equally spaced circumferential burners located in said shell around the circumference of said conduit or tube in the operation of the furnace. Because of the symmetrical spacing of the plural flues the portion of the heat transferred by convection and conduction from the flue gases is also evenly distributed around the circumference of the tube.

According to my invention there is provided another advantageous furnace of the foregoing description which contains a plurality of vertically disposed conduits or tubes adapted to confine a flowing fluid, each conduit or tube being placed in the direct path of a plane formed between a line formed by vertical rows of radiant burners and the line representing the axis of said shell, each conduit being equally spaced from its corresponding vertical row of burners. Thus, each tube receives the same amount of heat at any given level as the other tubes. In this furnace the symmetrically spaced flues also serve to evenly distribute the heat from the gases to the various tubes.

Other advantages of the invention are apparent from the disclosure, the drawings and the appended claims.

Figure 2:
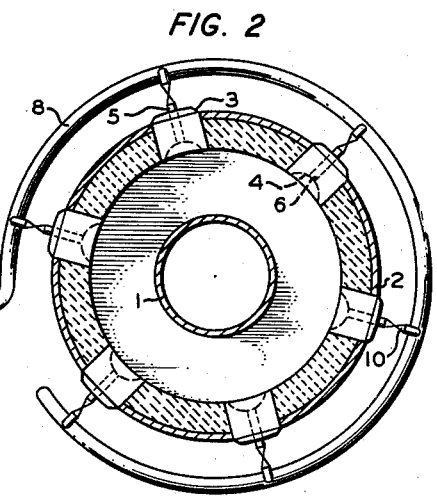
Figure 3:
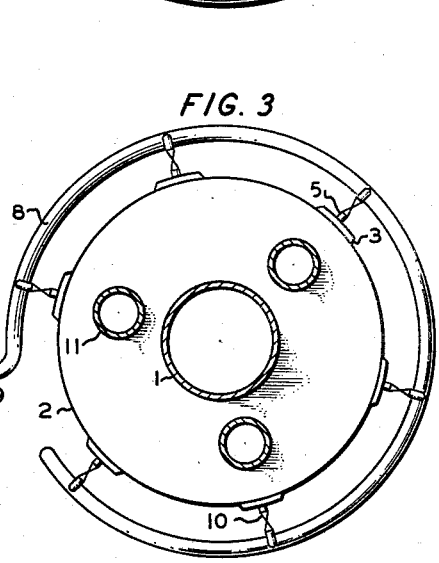

Figure 1 is a cross-sectional elevation of a now preferred form of the furnace of my invention. Figure 2 is a cross-section of Figure 1 taken along the line 2—2. Figure 3 is a cross-section of Figure 1 taken along the line 3—3. Figure 4 is a cross-sectional elevation of another form of the furnace of my invention. Figure 5 is a cross-section of Figure 4 taken along line 4—4.

Referring now to the furnace shown in Figures 1, 2, and 3, conduit 1 is disposed vertically and axially in cylindrical furnace shell 2. Shell 2 is constructed in a usual manner of refractory members capable of withstanding high temperatures, and has the usual outer covering of sheet metal. Plural radiant burners 3 are located in the wall of shell 2, and each contains combustion mixture distributing means 5 in refractory cups 6. The radiant burners 3 are arranged in circumferential rows of burners which are equally vertically spaced, and burners in each row are equally circumferentially spaced. Six burners in each row are shown, but the number can be more or less, although at least two, but preferably more than two, are employed according to the invention. Details of burner construction form no part of the present invention. It is sufficient to note that a combustible mixture is supplied to each cup through distributors 5 and is burned to heat the cup to a high temperature such that a large proportion of the heat absorbed by conduit 1 is transferred by radiation. Refractory shell 2 also becomes highly heated and contributes to the radiation.

Header 7 is provided for supply of combustible mixture to each individual header 8 which supplies each vertically spaced circumferential row of burners. Branching from each header 8 are the individual combustible mixture distributors 5 supplying each burner cup 6. The temperature of each circumferential row of burners is individually controllable by means of valves 9, and can be controlled by hand operation, or automatically in response to conventional temperature control equipment responsive to temperatures at various levels within the furnace or to temperatures at various locations within conduit 1. Valves 10 provide for individual control of the flow of fluid to each burner. Preferably, these valves are adjusted in the operation of the furnace so that the temperature of each radiant refractory burner cup in a particular circumferential row is the same as the others. A plurality of flues 11 for removal of hot combustion gases is provided, communicating with the top of shell 2. These flues are parallel to conduit 1 and are equidistant from the axis of conduit 1 and are circumferentially equally spaced from each adjacent flue. Three flues 11 are shown in the drawing but there may be more or fewer, at least two such flues being provided according to this invention. Conduit 12, which is a continuation of conduit 1, containing control valve 13 is provided for the introduction of charge material to be heated in the furnace, while conduit 14, which is a further extension of conduit 1 is provided for the withdrawal of effluent from the furnace. Conduit 15, containing valve 16, communicates with conduit 14 and is provided for the introduction of a quench material in certain cases.

In the operation of the furnace, charge material, for instance a hydrocarbon or a hydrocarbon mixture, is introduced through conduit 12, flows through conduit 1 and is withdrawn through conduit 14. During its passage through conduit 1, the hydrocarbon undergoes an endothermic reaction or conversion brought about by th effect of high temperature or by the combined effect of an elevated temperature and the presence of a catalyst, which can be disposed in conduit 1 or suspended in the charge material. As will be more fully described hereafter, the rate of heat input or the temperature in conduit 1 is controlled at each burner row level in the furnace by individually controlling the fuel mixture rate to each circumferential row of burners. Because of the symmetrical design of the furnace, the heat input to conduit 1 is even all around the circumference of the pipe at any given level. Thus, the design of the furnace eliminates overheating or hot spots at any given level in the conduit 1 due to an uneven heat input circumferentially. Further, the vertical conduit eliminates the possibility of cross-sectional segregation of a vapor phase from a liquid phase or a solid phase. A portion of the heat input to conduit 1 is furnished by convection from the hot flue gases vertically flowing through the furnace and out the flues at the top. The symmetrical spacing of the flues provides for an even flow of flue gases around the conduit 1, and thus this feature also contributes to obtain the desired high degree of evenness of heat input around the circumference of conduit 1 in the operation of the furnace. These features of the apparatus and its operation combine to provide conditions for conversion of a particular feed at optimum temperature conditions throughout a cross-sectional area, thus providing highest efficiency and yield.

Referring now to Figures 4 and 5, in which corresponding parts have the same number as in Figures 1, 2, and 3, another advantageous furnace of this invention is illustrated. It will be seen that conduit 1 has been replaced by a plurality of conduits 1a and that feed conduit 12 branches into conduits 12a, communicating with conduits 1a, with a corresponding arrangement on the outlet end of conduits 1a. Thus, in the operation of this furnace the feed flows through 12, and in parallel through conduits 12a, 1a, 14a, and finally through effluent conduit 14. Each conduit 1a is located equidistant from the axis of shell 2 and is circumferentially equally spaced from adjacent conduits 1a. As illustrated, each conduit 1a is directly in front of a vertical row of burners. Combustible mixture supply headers and conduits are not here shown but are arranged in the manner described and shown in connection with Figures 1, 2, and 3. As noted, each conduit 1a is directly in front of a vertical row of radiant burners, and is in a plane formed by a line formed by a vertical row of burners and a line represented by the axis of shell 2. Also, although not shown, there can be a plurality of circularly arranged, vertically spaced rows of radiant burners placed inside the cylinder represented by the conduits 1a, each vertical row of burners formed by individual burners in each circular row lying in the same imaginary plane mentioned above. Each of these burners points in the opposite direction to burners in the shell 2 which are located in the same plane. Each circular row of burners is individually controllable in the manner described in connection with rows of burners located in shell 2.

Further, according to my invention, there is provided a process which comprises preheating a material to be converted to a temperature usually not to exceed the desired temperature of conversion or reaction, passing the preheated material along a path through a conversion zone and effecting a conversion of said material therein, adding heat by radiation to said material along said path in said conversion zone from externally of said path, in quantities, and at points along said path such that the temperature of the conversion or reaction mixture does not substantially decrease during its flow through said conversion zone. While the process is applicable to controlling the temperature of an exothermic conversion, such as to obtain a faster rise in temperature than possible utilizing the exothermicity alone, by adding heat to the said material during its flow as described, the greatest present day need for the invention appears to be in its application to an endothermic reaction or conversion, and is of special interest where the material to be converted is a hydrocarbon. The invention is particularly applicable to reactions or conversions effected at temperatures over about 750° F.

The process of the invention is particularly applicable to a catalytic hydrocarbon endothermic conversion or reaction, such as catalytic reforming, butane dehydrogenation, or catalytic cracking of a hydrocarbon, for instance, a gas oil or residuum, in the presence of a suspended particulate solid catalyst.

Thus, according to an important aspect of my invention, two variants of which are shown in Figure 6 and Figure 7, respectively, there is provided a process for effecting an endothermic catalytic reaction or conversion of a hydrocarbon material which comprises preheating in a preheating zone the material to be converted to a temperature usually not exceeding the temperature of a subsequent conversion, adding solid particulate catalyst to said preheated material, the temperature and proportions of said catalyst and said material being such that the resulting combined stream of hydrocarbon and catalyst has a temperature not exceeding, and usually the same as, the temperature of said conversion, passing said combined stream along a path through an isothermal conversion zone and converting said material therein, adding heat by radiation to said material along said path of said isothermal conversion zone from externally of said path, in quantities, and at points along said path such that the temperature of the conversion mixture therein is maintained substantially constant and withdrawing said conversion mixture from said conversion zone.

Figure 6 illustrates one particularly advantageous application of this aspect of the invention, in which aspect the hydrocarbon material to be converted is a gas oil, the conversion effected is a cracking reaction, and the catalyst employed is fresh or regenerated catalyst. When employing a gas oil, however, according to this aspect, the conversion in the isothermal conversion zone is only partial, and the partially converted effluent then passes to an adiabatic conversion zone of the fluidized bed type, as illustrated. In the adiabatic conversion zone catalyst carried with the partially converted effluent from the isothermal conversion zone assumes a dense phase configuration and a desired conversion is completed substantially adiabatically. In this zone the converted products are substantially separated from the catalyst and then removed from the zone to further processing, while the separated spent catalyst is removed to a regeneration zone, not shown.

Figure 7 illustrates another advantageous application of this aspect of the invention, wherein the hydrocarbon material to be converted is a heavy residuum, the conversion is a cracking reaction, the catalyst is a fresh or regenerated catalyst, and the cracking isothermally effected in the isothermal conversion zone is carried out therein to the desired degree of conversion. The effluent from the isothermal conversion zone is immediately quenched by addition to the fluid stream of a quenched material such as a particulate solid, which may be an inert solid or a portion of spent catalyst which has been cooled, an inert gas or vapor, such as steam, or even an oil stream. The quench step can be effected by other known means such as indirect heat exchange. The quenched effluent flows to a catalyst separation zone as indicated in Figure 7.

The furnaces of Figures 1, 2, and 3 and of Figures 4 and 5, respectively, are particularly useful in the processes of Figures 6 and 7 as the isothermal conversion zone.

The following calculated examples compare adiabatic catalytic cracking of a gas oil employing fluidized solid catalyst with two specific examples of operation according to Figure 6. The results are graphically illustrated in Figure 8. Case I, or line A, represents the conventional adiabatic system; Case II, or line B, represents the system wherein the major portion of the cracking is first accomplished isothermally, the remaining cracking being adiabatic; and Case III, or line C, represents a system wherein the first and major portion of the cracking is accomplished in a zone in which the temperature progressively is increased during the conversion in said zone, the remaining cracking being adiabatic. Case III, or C on the graph of Figure 8, represents one rate of heat addition to the reactor tube where the oil starts at a low temperature (e.g., 899° F.) and is heated during the endothermic cracking reaction to about 912.5° F., at the end of the tube, resulting in an average temperature of about 908.5° F. The curve C', similar to Case III (line C), adds heat during the endothermic reaction starting at a higher temperature, 907° F., and ends at 912.5° F., but has a slightly higher average temperature than that of C. Also, any other shaped heating curve from about 900° F. up to 912.5° F. can be used to change this average temperature. In fact, the heating curve can have a concave-upward configuration, which will produce a yet lower average temperature. The heating rate curve can be any shape which is advantageous for a particular process. No calculated data are shown for the line C', to which no further reference is made.

Each case is calculated on the basis of 51 percent conversion. Each system operates at the same final conversion outlet temperature of 910° F. in order that the same efficiency of stripping will be realized, and the amounts of coke on the spent catalysts will be approximately the same in each case. On the graph (Figure 8), it is shown that Cases II and III, following point O, are heated to temperatures higher than the adiabat of Case I in order that the adiabatic sections of the curves of Cases II and III will produce the 910° F. reactor or outlet temperature. At point O, Case I has converted more than Case II, and Case II more than Case III, due to the higher average temperature of Case I over Case II over Case III. And a higher dense bed level is required of Case III, next highest for Case II, and lowest for Case I in order that the same total conversion is effected in each case.

The adiabatic portion of the curve for Case III has a greater slope than that portion of Case II; Case II has greater slope than Case I due to the amounts of conversion at point O.

Due to the lower average temperatures, the product qualities of Case III, Case II, and Case I, respectively, are of a decreasing order. Data are tabulated below:

| | Data |
|---|---|
| Gas oil charge | 36,000 b./d. |
| | API @ 60° F.=30.0. |
| Catalyst | Filtrol 58 Natural Catalyst.[1] |
| Catalyst/oil | 5.5/1.0 (weight ratio). |
| Conversion | 51%. |

[1] Filtrol 58 Natural Catalyst is natural clay or montmorillonite catalyst, commercially available, manufactured from naturally occurring clays calcined to about ten percent moisture content, and containing about fifteen percent fines. The surface area of new catalyst is about 300 square meters per gram.

| | Case I | Case II | Case III |
|---|---|---|---|
| Inlet Temp., ° F | 925 | 912 | 899 |
| Outlet Temp., ° F | 910 | 910 | 910 |
| Ave. Temp., ° F | 915 | 911 | 909 |
| Gas to Fuel, m.c.f./d | 7,447 | 7,272 | 7,190 |
| Alkylation Feed, b./d | 4,680 | 4,594 | 4,551 |
| Gasoline, b./d | 13,100 | 13,160 | 13,190 |
| Cycle Oil, b./d | (17,600) | (17,640) | (17,660) |
| Average Pressure, p.s.i.g | 10–12 | 10–12 | 10–12 |

It will be noted that the Case III of the specific examples just described represents an application of an aspect of the invention, not previously set forth in the description of Figure 6 or Figure 7, i.e., wherein the conversion temperature in the first conversion zone is progressively increasing instead of being isothermal. Thus, it is desirable to crack a hydrocarbon catalytically at as low an average temperature as practical and yet sufficiently high to produce a reactor temperature which will allow efficient stripping. The graph employs the same conversion (51 percent) for each of lines A, B, and C, but the curves, throughout the first conversion zone, produce different average temperatures of cracking decreasing in the order of A, B, and C. The heights of the dense bed in the adiabatic conversion zone increase in the order of A, B, and C in order that the same conversion is realized. However, the lower average conversion temperature produces less gaseous products, less coke, and more gasoline products, which is desired.

Thus, according to another important aspect of my invention, there is provided a process for effecting an endothermic catalytic reaction or conversion of a hydrocarbon material to be converted which comprises preheating said material in a preheating zone to a temperature usually not exceeding the temperature of a subsequent conversion, adding solid particulate catalyst to said preheated material, the temperature of said catalyst being such that the resulting combined stream of hydrocarbon and catalyst has a temperature not exceeding the initial temperature of said conversion, passing said combined stream along a path through a conversion zone and converting said material therein, adding heat to said material along said path of said conversion zone from externally of said path, in quantities, and at points, along said path such that the temperature of the conversion mixture therein is progressively increased during its flow along said path. The initial, intermediate and final temperatures of said conversion are desirably so controlled that an optimum average conversion temperature is maintained.

Thus, according to this aspect, in Figure 6 the conversion zone can be a rising temperature conversion zone instead of isothermal.

Thus, also in Figure 7 the isothermal conversion zone can be a rising temperature conversion zone.

One skilled in this art in possession of this disclosure and having read the same to understand its basic concepts will be able to effect variation and modification in the specific embodiments described herein by way of example, and also will be able to construct still other specific embodiments based upon the said concepts.

As will be evident to those skilled in the art, various modifications of this invention can be made or followed in the light of the foregoing disclosure and discussion without departing from the spirit or scope of the disclosure or from the scope of the claims.

I claim:

1. A furnace comprising a substantially cylindrical, vertically disposed refractory shell, means vertically disposed within said shell adapted to confine a flowing fluid so that said fluid flows downwardly at all times and in a substantially vertical direction, a plurality of vertically spaced, circumferential rows of radiant burners in said shell, the burners in each circumferential row being equally spaced from adjacent burners, each row of burners being adapted to be independently controlled as a unit, said furnace having a plurality of symmetrically located, circumferentially equally spaced flues at the top.

2. A furnace as set forth in claim 1 wherein said means is a single conduit, axially located within said shell, the single conduit so positioned thus being capable of receiving from said equally spaced circumferential burners located in said shell, an even flow of radiant heat around its circumference at any given level and also being capable of receiving an even flow of heat by convection and conduction from flue gases in the operation of said furnace.

3. A furnace according to claim 1 wherein said means comprises a plurality of vertically disposed conduits, each conduit being placed in the direct path of a plane formed between a line formed by vertical rows of radiant burners and the line representing the axis of said shell, each conduit being equally spaced radially from its corresponding vertical row of burners.

4. A process which comprises preheating a material to be converted to a temperature not to exceed the desired temperature of a subsequent conversion, passing the preheated material downwardly along a substantially vertical path through a conversion zone and effecting conversion of said material therein, adding heat by radiation to said material along said path in said conversion zone from externally of said path, in quantities, and at points, along said path such that the temperature of the conversion mixture does not substantially decrease during its flow through said conversion zone.

5. The process of claim 4 wherein the material to be converted is a hydrocarbon.

6. A process for effecting an endothermic catalytic conversion of a hydrocarbon material to be converted which comprises preheating said material in a preheating zone to a temperature not exceeding the temperature of a subsequent conversion, adding solid particulate catalyst to said preheated material, the temperature of said catalyst being such that the resulting combined stream of hydrocarbon and catalyst has a temperature not exceeding the initial temperature of said conversion, passing said combined stream along a path through a conversion zone and converting said material therein, adding heat by radiation to said material along said path of said conversion zone from externally of said path, in quantities, and at points along said path such that the temperature of the conversion mixture therein is progressively increased during its flow along said path.

7. A process for effecting an endothermic catalytic reaction or conversion of a hydrocarbon material to be converted which comprises preheating said material in a preheating zone, adding solid particulate catalyst to said preheated material, the temperatures and proportions of said catalyst and said material being such that the resulting combined stream of hydrocarbon and catalyst has a temperature not exceeding the initial conversion temperature employed in a subsequent conversion zone, passing said combined stream downwardly along a substantially vertical path through a conversion zone and converting said material therein, adding heat by radiation to said material along said path of said conversion zone from externally of said path, in quantities, and at points along said path such that the temperature of the conversion mixture therein is progressively increased during its flow along said path, the initial, intermediate and final temperatures of said conversion being so controlled as to maintain an optimum average conversion temperature.

8. A process for effecting an endothermic catalytic conversion of a hydrocarbon which comprises preheating in a preheating zone the material to be converted, adding solid particulate catalyst to said preheated material, the temperatures and proportions of said catalyst and said material being such that the resulting combined stream of hydrocarbon and catalyst has a temperature which is substantially that employed in a subsequent conversion in an isothermal conversion zone, passing said combined stream downwardly along a substantially vertical path through said isothermal conversion zone and converting said material therein, adding heat by radiation to said material along said path of said isothermal conversion zone from externally of said path, in quantities, and at points along said path such that the temperature of the conversion mixture therein is maintained substantially constant and withdrawing said conversion mixture from said conversion zone.

9. The process of claim 4 wherein said temperature is over about 750° F.

10. The process of claim 4 wherein said conversion is endothermic.

11. The process of claim 6 wherein said conversion is catalytic cracking.

12. The process of claim 7 wherein said conversion is catalytic cracking.

13. The process of claim 8 wherein said conversion is catalytic cracking.

14. A furnace according to claim 7 having a plurality of circumferentially arranged vertically spaced rows of radiant burners disposed inside the imaginery cylinder represented by said plurality of vertically disposed conduits, each of these last mentioned burners pointing directly toward a corresponding burner in said shell.

15. A process for effecting an endothermic catalytic conversion of a hydrocarbon which comprises preheating in a preheating zone a material to be converted, adding solid particulate catalyst to said preheated material, temperatures and proportions of said catalyst and said material being such that the resulting combined stream of hydrocarbon and catalyst has a temperature which is substantially that employed in a subsequent conversion in an isothermal conversion zone, passing said combined stream along a path through said isothermal conversion zone and converting said material therein to a degree of conversion below that finally desired, adding heat by radiation to said material along said path of said isothermal conversion zone from externally of said path, in quantities, and at points along said path such that the temperature of the conversion mixture therein is maintained substantially constant, and withdrawing said conversion mixture from said conversion zone; and then immediately conducting said conversion mixture through an adiabatic conversion zone of the fluidized bed type and therein completing said conversion adiabatically.

16. A process of claim 15 wherein said conversion is catalytic cracking of a gas oil.

17. A process for effecting catalytic cracking of a gas oil which comprises preheating in a preheating zone the material to be converted, adding solid particulate catalyst to said preheated material, the temperatures and proportions of said catalyst and said material being such that the resulting combined stream of gas oil and catalyst has a temperature which is substantially the initial temperature employed in a subsequent conversion zone, passing said combined stream along a path through said subsequent conversion zone and cracking said gas oil therein to a conversion lower than ultimately desired, adding heat by radiation to said gas oil along said path of said conversion zone from externally of said path, in quantities, and at points along said path such that temperature of the conversion is progressively increased during its flow along said path; then immediately withdrawing said partially cracked material from said conversion zone and conducting same, along with said catalyst mixed therewith, to an adiabatic conversion zone of the fluidized bed type and completing said conversion therein adiabatically.

References Cited in the file of this patent

UNITED STATES PATENTS

| | | |
|---|---|---|
| 1,887,047 | Smith | Nov. 8, 1932 |
| 1,903,568 | Goldsbrough | Apr. 11, 1933 |
| 2,035,900 | Loeb | Mar. 31, 1936 |
| 2,596,145 | Grote | May 13, 1952 |
| 2,598,840 | Schutte | June 3, 1952 |
| 2,629,684 | Leffer | Feb. 24, 1953 |
| 2,645,566 | Stookey | July 14, 1953 |